United States Patent
Ragold (10) Patent No.: US 6,254,307 B1
(45) Date of Patent: Jul. 3, 2001

(54) BI-PARTITE SLUICEWAY APPARATUS WITH SILT REMOVAL TRAY COMPONENTS

(76) Inventor: Richard E. Ragold, 413 Dutch Hill Rd., Danby, VT (US) 05739

(*) Notice: Subject to any disclaimer, the term of this patent is extended or adjusted under 35 U.S.C. 154(b) by 0 days.

(21) Appl. No.: 09/466,850

(22) Filed: Dec. 20, 1999

(51) Int. Cl.$^7$ .................................................. E01C 11/22
(52) U.S. Cl. .............................. 404/4; 405/39; 405/118; 405/126
(58) Field of Search .................. 404/2, 3, 4; 405/39, 405/40, 118, 124, 125, 126

(56) References Cited

U.S. PATENT DOCUMENTS

| | | |
|---|---|---|
| 4,630,966 | 12/1986 | Karbstein . |
| 4,878,782 | 11/1989 | Beattie et al. . |
| 4,940,359 * | 7/1990 | Van Duyn et al. ............... 405/118 |
| 4,986,693 * | 1/1991 | Salberg et al. ....................... 404/4 |
| 5,232,587 | 8/1993 | Hegemier et al. . |
| 5,256,000 | 10/1993 | Beamer . |
| 5,284,580 | 2/1994 | Shyh . |
| 5,372,714 | 12/1994 | Logue, Jr. . |
| 5,403,464 | 4/1995 | Emery . |
| 5,489,163 | 2/1996 | Thomann . |
| 5,529,436 | 6/1996 | Meyers . |
| 5,647,689 | 7/1997 | Gunter . |
| 5,788,849 | 8/1998 | Hutter, Jr. et al. . |
| 5,810,513 * | 9/1998 | Beamer et al. ....................... 405/119 |

FOREIGN PATENT DOCUMENTS

2234001 * 1/1991 (GB) .

* cited by examiner

Primary Examiner—David Bagnell
Assistant Examiner—Jennifer R. Dougherty
(74) Attorney, Agent, or Firm—John J. Welch Jr., Esq (57) ABSTRACT

A bi-partite sluiceway apparatus with silt removal tray components consisting of a pair of elongated three-sided bottom containment trays with triangularly shaped soffet units affixed to outer walling of lateral sides of each and with each having oppositely inclined beveled posterior ends with each tray holding at top edging of lateral sides thereof, elongated three-sided silt collection trays each with beveled posterior ends as well and with each silt collection tray having a grasping plate characterized by the presence of a concentrically positioned through hole and being affixed to lateral sides thereof near a front end thereof and with each silt collection tray being swiveably lockable to a containment tray by way of a nut and bolt assembly insertable through concentric through holes near frontal ends of each tray, and with all beveled ends in contact with one another upon complete assembly of the apparatus within a roadbed.

2 Claims, 6 Drawing Sheets

BI-PARTITE SLUICEWAY APPARATUS WITH SILT REMOVAL TRAY COMPONENTS

CROSS REFERENCES TO PRIOR OR PARENT APPLICATIONS

There are no prior or parent applications to which the instant application relates.

FEDERALLY SPONSORED RESEARCH AND DEVELOPMENT

There is no federally sponsored research and development to which the instant invention relates.

BACKGROUND OF THE INVENTION

1. Field of the Invention

The instant invention relates to that class of devices serving to facilitate drainage of rainwater from highways and roads servicing motor vehicular travel.

2. Related Art

The contemporaneously filed Art Information Statement sets forth art that however does not anticipate the instant invention.

A SUMMARY OF THE INVENTION

1. A Brief Description of the Invention:

The instant invention consists of a pair of elongated three-sided bottom containment trays with triangularly shaped soffet units affixed to lateral walling of each. Each tray has a beveled posterior end, each such end being oppositely inclined so as to facilitate joinder of each tray at each such end of each when the trays are embedded within a roadway with the abovementioned soffet units serving to facilitate anchoring of the trays in place within the bed of the roadway. Each containment tray holds one silt collection tray with all trays being similar in length. Each silt collection tray has a posteriorly positioned grasping plate affixed to it. A nut and bolt combination serves to, via through holes concentrically positioned near anterior ends of and through each of the containment and silt collection trays, lock them swiveably together.

2. Object of the Invention:

Somewhat steeply inclined and especially unpaved roadways are amenable to not infrequent "washout" destruction after having been subjected to prolonged and/or acute but heavy flowings of water from vantage points higher than but in apposition to such roadways. Such destruction of such roadways is moreover not uncommon in the face of upground melting snow and ice during spring seasons. The instant invention serves to minimize such destruction by providing diversionary sluiceways in the direction of and to the lateral earthen borders of such roadways for diversion thereto of such flowing rainwater or water from such melting snow and ice and concomitant loose silt. Moreover, by virtue of the readily removable tray within a tray feature of the invention, a cleaning away of deposited silt so as to render the invention continuously functional is easily accomplished.

Respectfully submitted, in view of the foregoing, the instant invention being not only new and unique is also unquestionably useful.

Figure 1:
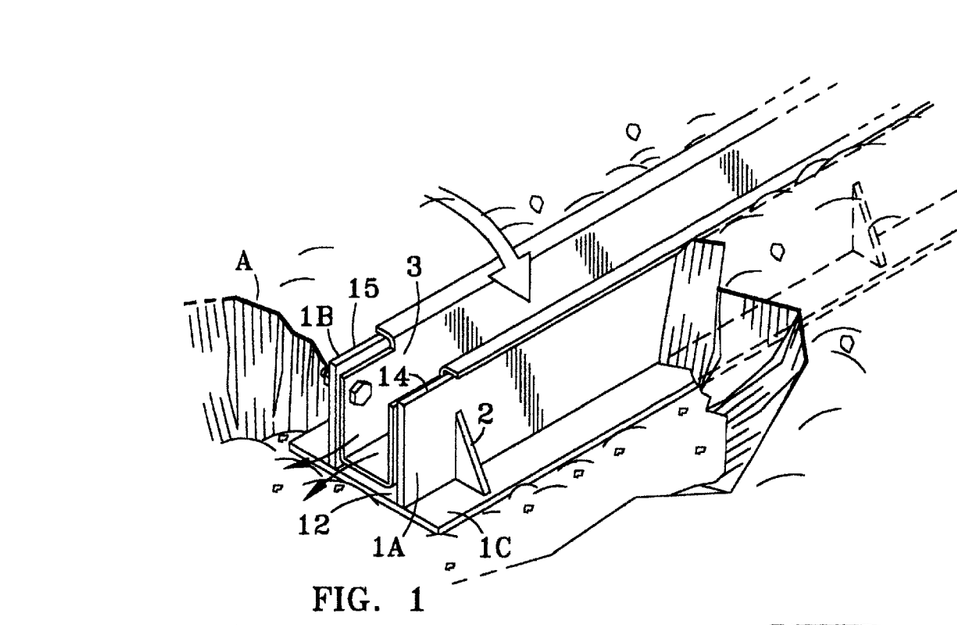
FIG. 1 is a perspective view of a frontal portion of a part of the instant invention embodied in a roadway.
Figure 2:
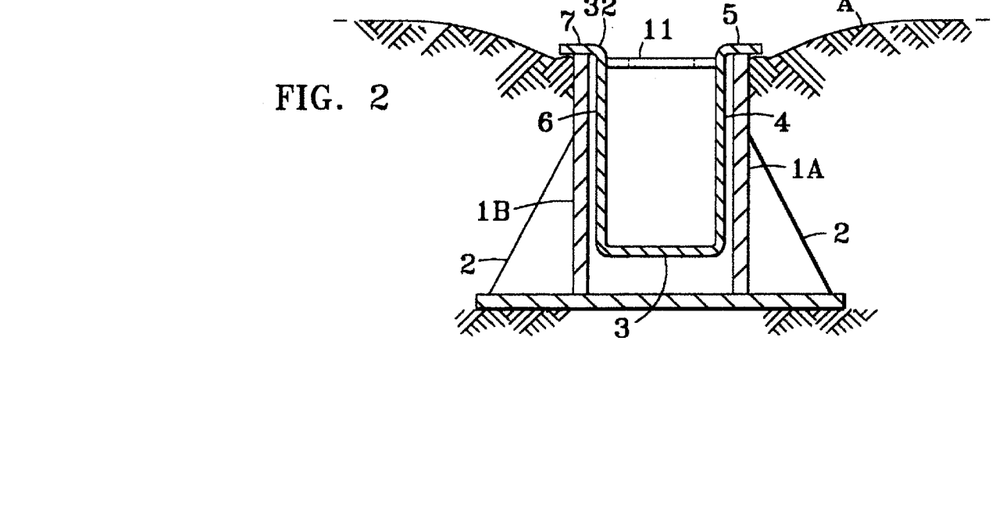
FIG. 2 is a cross-sectional view of the bottom containment tray components of the instant invention and one of the collection tray components shown resting therein.
Figure 3:
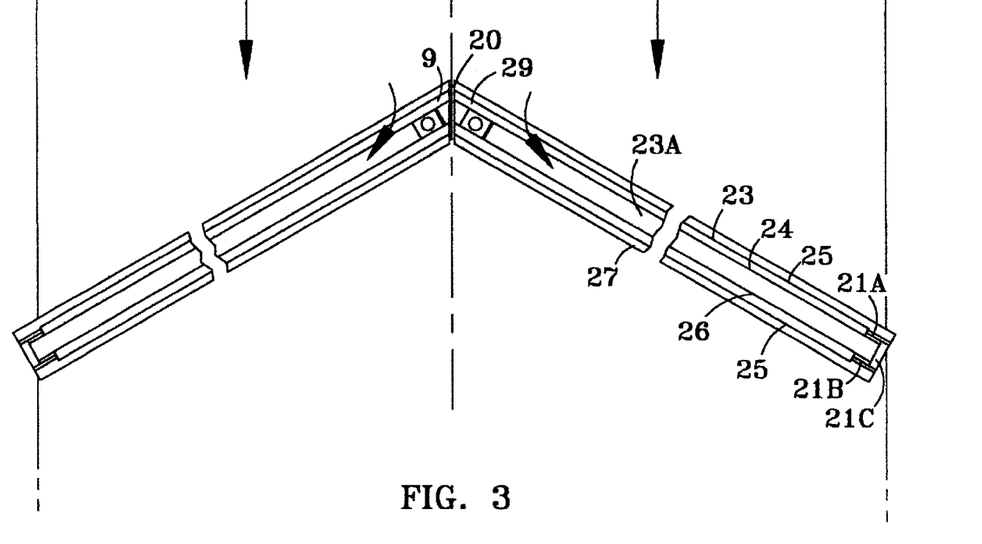
FIG. 3 is a top plan view of the two bottom containment tray components and the two silt collection tray components of the instant invention in contact with one another at beveled posterior ends of each.
Figure 4:
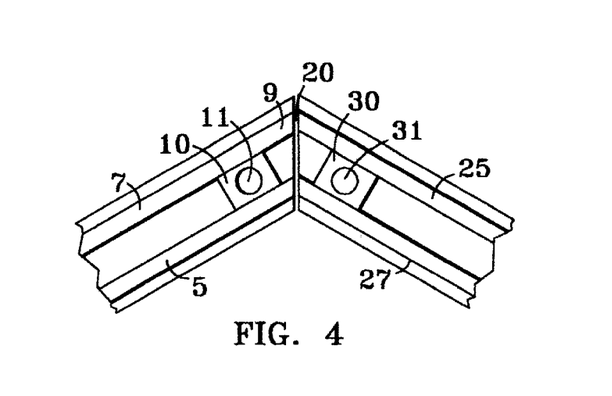
FIG. 4 is a close-up isolated top plan view evidencing the manner in which the oppositely inclined beveled posterior ends of each bottom containment tray component and silt collection tray component of the instant invention contact one another.
Figure 6:
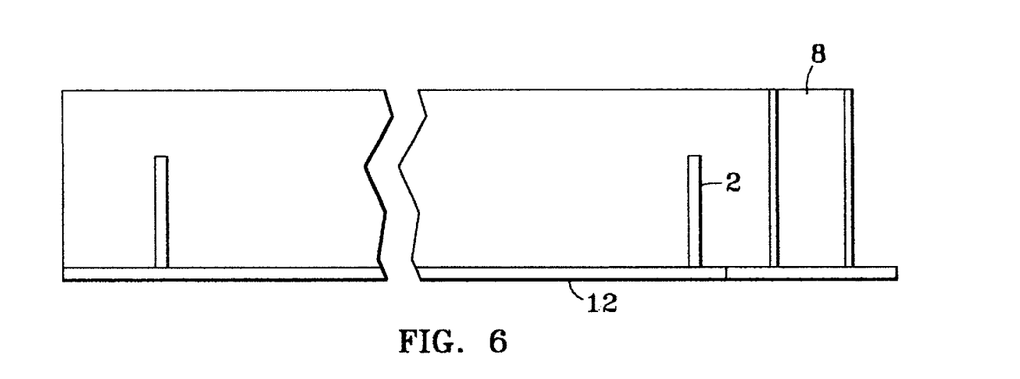
FIG. 6 is a broken lateral plan view of one of the two bottom containment tray components of the instant invention.
Figure 7:
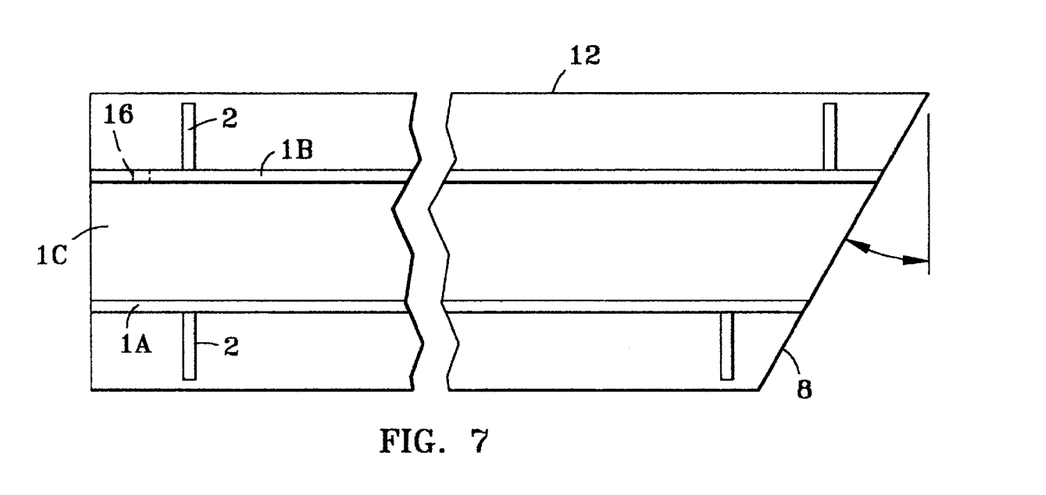
FIG. 7 is a broken top plan view of one of the two bottom containment tray components of the instant invention.
Figure 9:
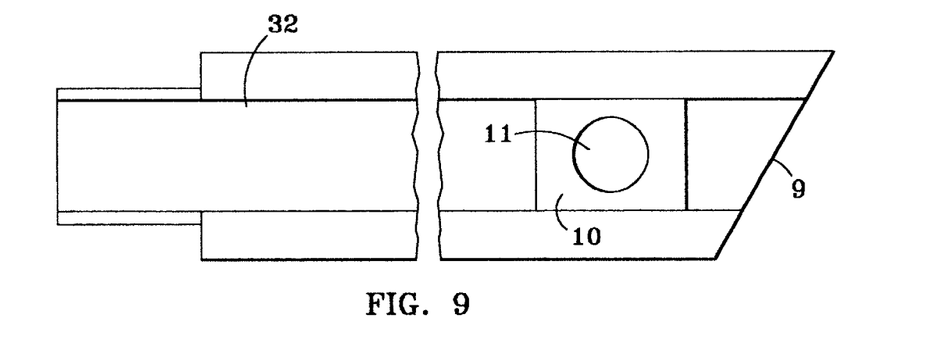
FIG. 9 is a broken top plan view of the frontal and posterior ends of one of the silt collection tray components of the instant invention.

A first elongated side bottom containment tray 12 of the instant invention as seen in FIG. 1. It consists of a first lateral side 1A, a second lateral side 1B and a bottom side 1C. Side 1C is rectangularly shaped and extends outwardly beyond the lies of sides 1A and 1B thereof. A plurality of right triangularly shaped soffet units 2 are attached to outer walling of sides 1A and 1B as more particularly seen in FIG. 2. Frontal edging of tray 12 is perpendicularly oriented to sides 1A and 1B thereof as well as to side 1C, itself perpendicularly oriented to parallel sides 1A and 1B. As can be noted with resort to FIGS. 6 and 7, tray 12 has a beveled posterior end 8. FIGS. 1 and 2 serve to depict a first elongated silt collection tray 3 of the invention. Tray 32 has a bottom side 3A which is perpendicularly oriented to frontal edging thereof and to a first lateral side 4 and a second lateral side 6 thereof which are both in turn parallel in lie and perpendicular to side 3 and the frontal edging of tray 3. First lateral side 4 has a right angularly inclined uppermost portion 5. Second lateral side 6 has a right angularly inclined uppermost portion 7, all of which can be seen with resort to FIG. 2. Also, tray 32 has a beveled posterior end 9 as can be seen in FIGS. 3 and 4. First grasping plate 10 of tray 3 and its concentrically positioned first through hole 11 can be seen in FIG. 9. Plate 10 is affixed to inner walling of sides 4 and 6 of tray 32 near the beveled posterior end 9 thereof. Tray 32 is supported on top edgings 14 of side 1A of tray 12 and 15 of side 1B of tray 12 by way of right angularly inclined uppermost portion 5 of side 4 of tray 32 and by way of right angularly inclined uppermost portion 7 of side 6 of tray 32 as seen in FIG. 1.

Figure 8:
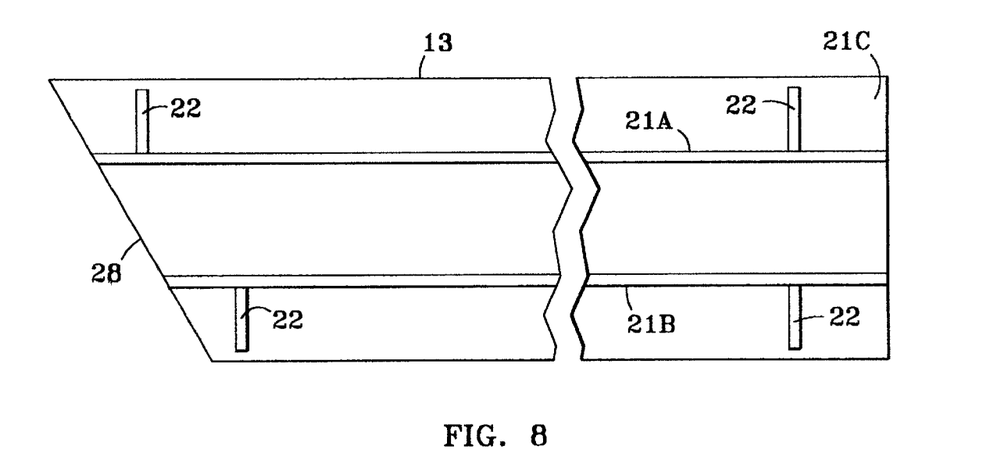
FIG. 8 is a broken top plan view of the other one of the bottom containment tray components of the instant invention.
Figure 10:
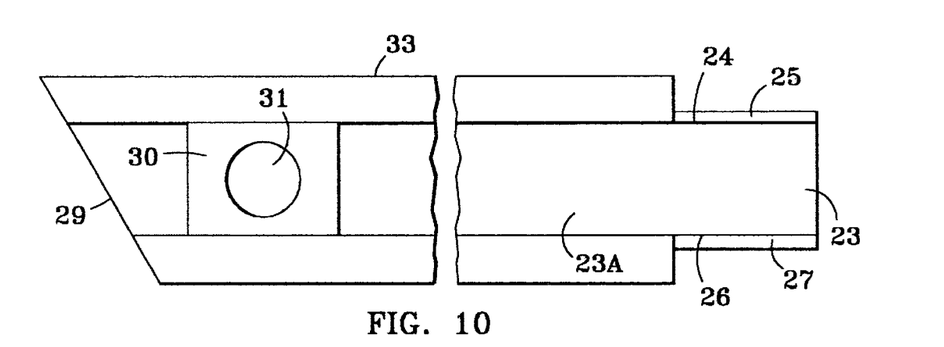
FIG. 10 is a broken top plan view of the frontal and posterior ends of the other one of the silt collection tray components of the instant invention.
Figure 11:
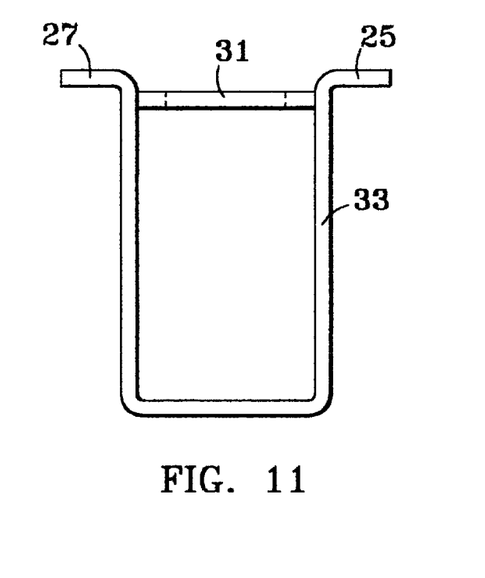
FIG. 11 is a frontal plan view of one of the silt collection tray components of the instant invention.
Figure 12:
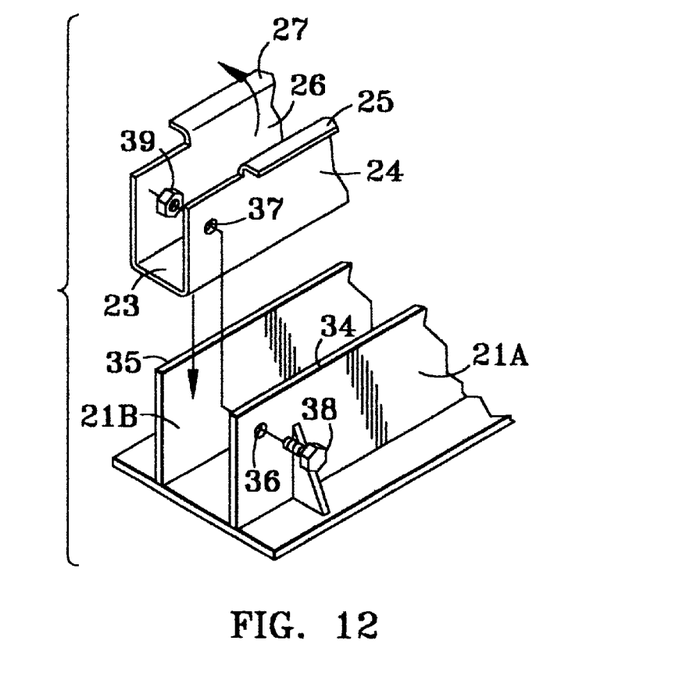
FIG. 12 is an exploded perspective view serving to illustrate the manner in which one of the bottom containment tray components of the instant invention receives and holds a silt collection tray component of the instant invention.

A second elongated three sided bottom containment tray 13 of the invention identical to tray 1 thereof is seen in FIG. 3. It consists of a first lateral side 21A, a second lateral side 21B and a bottom side 21C. Side 21C shaped and extends outwardly beyond the lies of sides 21A and 21B thereof. A plurality of right triangularly shaped soffet units 22 are attached to outer walling of sides 21A and 21B as more particularly seen in FIG. 12. Frontal edging of tray 13 is perpendicularly oriented to sides 21A and 21B thereof as well as to side 21C, itself perpendicularly oriented to parallel sides 21A and 21B. As can be noted with resort to FIG. 8, tray 13 has a beveled posterior end 28. FIGS. 3 and 10 serve to depict a second elongated slit collection tray 23 of the invention. Tray 33 identical to tray 32 has a bottom side 23 which is perpendicularly oriented to frontal edging thereof and to a first lateral side 24 and a second lateral side 26 thereof which are both in turn parallel in lie and perpendicular to bottom side 23 and the frontal edging of tray 33. First lateral side 24 has a right angularly inclined uppermost portion 25. Second lateral side 26 has a right angularly inclined uppermost portion 27, all of which can be seen with resort to FIG. 10 and FIG. 12. Also tray 33 has a beveled posterior end 29 oppositely inclined to the incline of end 9 of tray 32 as can be seen in FIG. 3. Second grasping plate 30 of tray 33 and its concentrically positioned second through hole 31 can be seen in FIG. 4 and FIGS. 10 and 11. Plate 30 is affixed to inner walling of sides 24 and 26 of tray 23 near the frontal end thereof Plate 23 is affixed to inner walling of sides 24 and 26 of tray 323 near the beveled posterior end 28 thereof. Tray 33 is supported on top edgings 34 of side 21A of tray 13 and 35 of side 21B of tray 13 by way of right angularly inclined uppermost portion 25 of side 24 of tray 23 and by way of right angularly inclined uppermost portion 27 of side 26 of tray 33 as seen in FIG. 12.

Figure 5:
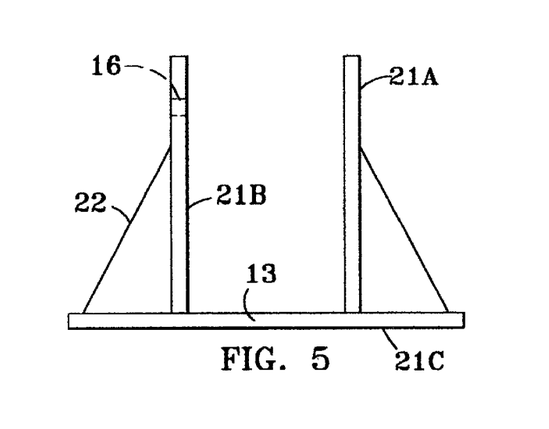
FIG. 5 is a frontal plan view of one of the two bottom containment tray components of the instant invention.
Figure 13:
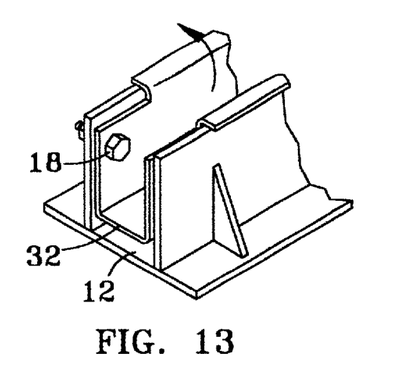
FIG. 13 is a perspective view of a portion of a bottom containment tray component of the instant invention lockably holding a silt collection tray component thereof.
Figure 14:
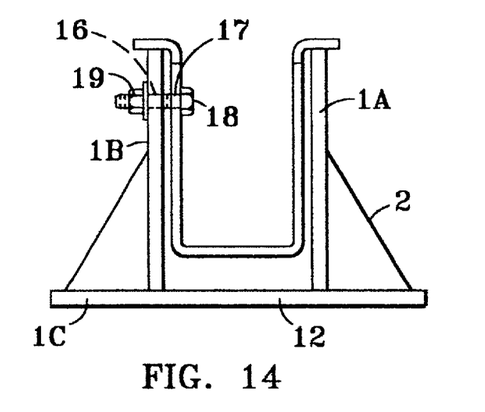
FIG. 14 is a frontal plan view of what is seen in FIG. 13.
Figure 15:
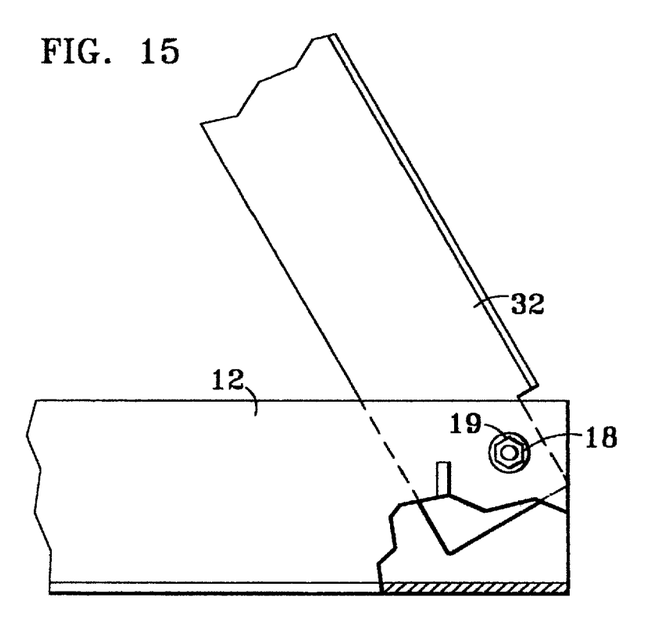
FIG. 15 is a lateral plan view illustrating pivotability about a locking mechanism of a silt collection tray component within a bottom containment tray component.

The invention is assembled by way of placing tray 32 into tray 12 as noted above and by placing tray 33 into tray 13 also as noted above. Trays 12 and 13 are embedded within the earthen essence of a dirt roadway A as seen in FIG. 1 and supported therein by way of soffets 2 and 22 seen in FIG. 1 and FIG. 8 respectively. Tray 13 and soffets 22 in a roadway A would be embedded as is tray 12 with soffets 2 in a roadway A as seen in FIG. 1. Trays 12 and 13 are so embedded as to form an inverted V, the apex of which is upground from the respective frontal edgings of trays 12 and 13. Basal edgings of beveled ends 8 and 28 and 9 and 29 of trays 12, 32 and 13, 33 respectively are joined pointwise everywhere in contact with one another, 8 to 29, 28 to 29 along line 20 as seen FIGS. 3 and 4 upon such assembly of the invention embedded within such a roadway A. Water running downhill on the roadway is diverted by way of trays 32 and 33 to the earthen sides of the roadway A as depicted schematically by the arrows in FIG. 3 thereby preventing the vast degree of washout over time over the course of repeated rainstorms and/or snowmelts that would be noted in roadway A without the presence of various units of the intact invention placed strategically v-shaped unit after unit from near the highest point of roadway A to near the lowest point thereof. A first threaded holding bolt 18 fits through a third through hole 17 of tray 32 and a fourth through hole 16 of tray 12 inward to outward to pivotably lock tray 32 to tray 12 via first holding nut 19 all as can be seen with resort to FIGS. 13, 14 and 15 to thus prevent separation of tray 32 from tray 12 after embedding of tray 1 into roadway A as noted above. A second holding bolt 38 fits through a fifth through hole 36 of tray 13 seen in FIG. 5 and a sixth through hole 37 of tray 33 outward to inward to pivotably lock tray 33 to tray 13 via second holding nut 39. These features are noted in FIG. 12 and operate in the same manner as the locking features as noted in FIGS. 13–15. Such pivotability enables one to quickly and easily swivel trays 32 and 33 upwardly by way of a grasping tray 32 via grasping hole 11 and tray 33 via grasping hole 31 in order to clear therefrom silt and debris therein collected during the course of water diversion so that such trays will be clean in preparation of the next ensuring rain or melting snow event as would impact the roadway.

In conclusion, once again, respectfully submitted, the instant invention is not only new and useful but it is also unquestionably unique.

What is claimed is:

1. A bi-partite sluiceway apparatus with silt removal tray components, comprising:

a. a first elongated three-sided bottom containment tray;

b. a plurality of right triangularly shaped soffet units affixed to outer walling of each lateral side of said first elongated three-sided bottom containment tray;

c. said first elongated three-sided bottom containment tray having frontal edging, a planar orientation of which is perpendicular to a planar orientation of parallel lateral sides thereof, d. said lateral sides thereof being a first lateral side and a second lateral side both being perpendicularly inclined with respect to a rectangularly shaped bottom side thereof, which said bottom side extends laterally from a lie of said first lateral side and from a lie of said second lateral side;

e. said first elongated three-sided bottom containment tray having a beveled posterior end;

f. an elongated three-sided first silt collection tray;

g. said elongated three-sided first silt collection tray being characterized everywhere throughout except as near a frontal end thereof by a right angularly inclined uppermost portion of a first lateral side thereof and a right angularly inclined uppermost portion of a second lateral side thereof;

h. said elongated three-sided first silt collection tray having frontal edging a planar orientation of which is perpendicular to a planar orientation of said first lateral side and a planar orientation of said second lateral side, each of which said lateral sides are parallel with one another and perpendicularly inclined with respect to a bottom side thereof;

i. said elongated three-sided first silt collection tray having a beveled posterior end;

j. a first grasping plate characterized by the presence of a concentrically positioned first through hole;

k. said first grasping plate being affixed along lateral sides thereof to inner walling of said elongated three-sided first silt collection tray near said beveled posterior end thereof;

l. said elongated three-sided first silt collection tray being joinably supported along a bottom side of said right angularly inclined uppermost portion of said first lateral side thereof by top edging of said first lateral side of said first elongated three-sided bottom containment tray and along a bottom side of said right angularly inclined uppermost portion of said second lateral side by top edging of said second lateral side of said first elongated three-sided bottom containment tray;

m. a second elongated three-sided bottom containment tray;

n. a plurality of right triangularly shaped soffet units affixed to outer walling of each lateral side of said second three-sided bottom containment tray;

o. said second elongated three-sided bottom containment tray having frontal edging, a planar orientation of which is perpendicular to a planar orientation of parallel lateral sides thereof;

p. said lateral sides thereof being a first lateral side and a second lateral side both being perpendicularly inclined with respect to a bottom side thereof;

q. said second elongated three-sided bottom containment tray having a beveled posterior end which said beveled posterior end is oppositely inclined to said beveled posterior end of said first elongated three-sided bottom containment tray;

r. an elongated three-sided second silt collection tray;

s. said elongated three-sided second silt collection tray being characterized everywhere throughout except as near a frontal end thereof by a right angularly inclined uppermost portion of a first lateral side thereof and a right angularly inclined uppermost portion of a second lateral side thereof;

t. said elongated three-sided second silt collection tray having a frontal edging, a planar orientation of which is perpendicular to a planar orientation of said first lateral side and a planar orientation of said second lateral side, each of which said lateral sides are parallel with one another and perpendicularly inclined with respect to a bottom side thereof;

u. said elongated three-sided second silt collection tray having a beveled posterior end which said beveled posterior end is oppositely inclined to said beveled posterior end of said elongated three-sided first silt collection tray;

v. a second grasping plate characterized by the presence of a concentrically positioned second through hole;

w. said second grasping plate being affixed along lateral sides thereof to inner walling of said elongated three-sided second silt collection tray near said beveled posterior end thereof;

x. the whole of a basal edging of said beveled posterior end of said first elongated three-sided bottom containment tray and the whole of a basal edging of said beveled posterior end of said second elongated three-sided containment tray being everywhere pointwise in contact with one another upon assembly of the instant invention within a roadbed, and;

y. the whole of a basal edging of said beveled posterior end of said elongated three-sided first silt collection tray and the whole of a basal edging of said beveled posterior end of said elongated three-sided second silt collection tray being everywhere pointwise in contact with one another upon assembly of the instant invention within a roadbed.

2. A bi-partite sluiceway apparatus with silt removal tray components, comprising:

a. a first elongated three-sided bottom containment tray;

b. a plurality of right triangularly shaped soffet units affixed to outer walling of each lateral side of said first elongated three-sided bottom containment tray;

c. said first elongated three-sided bottom containment tray having frontal edging, a planar orientation of which is perpendicular to a planar orientation of parallel lateral sides thereof;

d. said lateral sides thereof being a first lateral side and a second lateral side both being perpendicularly inclined with respect to a rectangularly shaped bottom side thereof, which said bottom side extends laterally from a lie of said first lateral side and from a lie of said second lateral side;

e. said first elongated three-sided bottom containment tray having a beveled posterior end;

f. an elongated three-sided first silt collection tray;

g. said elongated three-sided first silt collection tray being characterized everywhere throughout except as near a frontal end thereof by a right angularly inclined uppermost portion of a first lateral side thereof and a right angularly inclined uppermost portion of a second lateral side thereof;

h. said elongated three-sided first silt collection tray having frontal edging a planar orientation of which is perpendicular to a planar orientation of said first lateral side and a planar orientation of said second lateral side, each of which said lateral sides are parallel with one another and perpendicularly inclined with respect to a bottom side thereof;

i. said elongated three-sided first silt collection tray having a beveled posterior end;

j. a first grasping plate characterized by the presence of a concentrically positioned first through hole;

k. said first grasping plate being affixed along lateral sides thereof to inner walling of said elongated three-sided first silt collection tray near said beveled posterior end thereof;

l. said elongated three-sided first silt collection tray being joinably supported along a bottom side of said right angularly inclined uppermost portion of said first lateral side thereof by top edging of said first lateral side of said first elongated three-sided bottom containment tray and along a bottom side of said right angularly inclined uppermost portion of said second lateral side by top edging of said second lateral side of said first elongated three-sided bottom containment tray;

m. a second elongated three-sided bottom containment tray;

n. a plurality of right triangularly shaped soffet units affixed to outer walling of each lateral side of said second three-sided bottom containment tray;

o. said second elongated three-sided bottom containment tray having frontal edging, a planar orientation of which is perpendicular to a planar orientation of parallel lateral sides thereof, p. said lateral sides thereof being a first lateral side and a second lateral side both being perpendicularly inclined with respect to a bottom side thereof;

q. said second elongated three-sided bottom containment tray having a beveled posterior end which said beveled posterior end is oppositely inclined to said beveled posterior end of said first elongated three-sided bottom containment tray;

r. an elongated three-sided second silt collection tray;

s. said elongated three-sided second silt collection tray being characterized everywhere throughout except as near a frontal end thereof by a right angularly inclined uppermost portion of a first lateral side thereof and a right angularly inclined uppermost portion of a second lateral side thereof;

t. said elongated three-sided second silt collection tray having a frontal edging, a planar orientation of which is perpendicular to a planar orientation of said first lateral side and a planar orientation of said second lateral side, each of which said lateral sides are parallel with one another and perpendicularly inclined with respect to a bottom side thereof;

u. said elongated three-sided second silt collection tray having a beveled posterior end which said beveled posterior end is oppositely inclined to said beveled posterior end of said elongated three-sided first silt collection tray;

v. a second grasping plate characterized by the presence of a concentrically positioned second through hole;

w. said second grasping plate being affixed along lateral sides thereof to inner walling of said elongated three-sided second silt collection tray near said beveled posterior end thereof;

x. the whole of a basal edging of said beveled posterior end of said first elongated three-sided bottom containment tray and the whole of a basal edging of said beveled posterior end of said second elongated three-sided containment tray being everywhere pointwise in contact with one another upon assembly of the instant invention within a roadbed, and;

y. the whole of a basal edging of said beveled posterior end of said elongated three-sided first silt collection tray and the whole of a basal edging of said beveled posterior end of said elongated three-sided second silt collection tray being everywhere pointwise in contact with one another upon assembly of the instant invention within a roadbed;

z. a third through hole located near a frontal end of said elongated three-sided first silt collection tray and found in one of said first and second lateral sides thereof adjacent said one lateral side of said first elongated three-sided bottom containment tray wherein a fourth through hole is found when said elongated three-sided first silt collection tray is found resting upon and within said first elongated three-sided bottom containment tray;

aa. said third through hole and said fourth through hole having a common horizontally aligned central axis of symmetry;

bb. said fourth through hole being located near said frontal end of said first elongated three-sided bottom containment tray and found in said one of said lateral sides thereof;

cc. a fifth through hole located a frontal end of said second elongated three-sided bottom containment tray and found in one of said lateral sides thereof;

dd. a sixth through hole located near a frontal end of said elongated three-sided second silt collection tray and found in that one of said first and second lateral sides thereof adjacent said one lateral side of said second elongated three-sided bottom containment tray wherein said fifth through hole is found when said elongated three-sided second silt collection tray is found resting upon and within said elongated three-sided second bottom containment tray;

ee. said fifth through hole and said sixth through hole having a common horizontally aligned central axis of symmetry;

ff. a first threaded bolt means insertable through said third through hole and said fourth through hole for swiveably locking said first elongated three-sided bottom containment tray to said elongated three-sided first silt collection tray when said first threaded bolt means is held in place by a first nut threadably tightened thereupon, and;

gg. a second threaded bolt means insertable through said fifth through hole and said sixth through hole for swiveably locking said second elongated three-sided bottom containment tray to said elongated three-sided second silt collection tray when said second theaded bolt means is held in place by a second nut threadably tightened thereupon.

\* \* \* \* \*